United States Patent [19]

Müller

[11] 4,268,093
[45] May 19, 1981

[54] AIR BRAKE SAFETY MECHANISM

[76] Inventor: Zdenek Müller, 2032 Kingsford, Sydney, New South Wales, Australia

[21] Appl. No.: 57,275

[22] Filed: Jul. 13, 1979

[51] Int. Cl.³ .............................................. B60T 17/16
[52] U.S. Cl. ........................................... 303/89; 92/28
[58] Field of Search ...................... 91/45; 92/22–25, 92/27, 28; 188/265; 303/89

[56] References Cited

U.S. PATENT DOCUMENTS 2,759,569  8/1956  Keehn ................................ 303/89 X

*Primary Examiner*—Duane A. Reger
*Attorney, Agent, or Firm*—Keith D. Beecher

[57] ABSTRACT

An air brake safety and parking mechanism is provided in the form of an emergency braking system which operates automatically to set and latch the air brakes of a vehicle in a braking position whenever the air pressure of the service braking system of the vehicle drops below a pre-selected threshold, and which also can be set and released mechanically for parking purposes. The mechanism includes an aperatured latch through which an actuating rod for the air brakes of the vehicle extends and is freely slidable so long as the latch is in a first angular position, but which is engaged by the latch when the latch is in a second angular position to prevent movement of the rod in a direction which would release the brakes of the vehicle. A feature of the mechanism is that it can subsequently be released and then re-set so that the brake can be used for parking purposes, for example, for a trailer. Should it become necessary to move the trailer in the parking facility the brake can be mechanically released and subsequently re-set.

10 Claims, 8 Drawing Figures

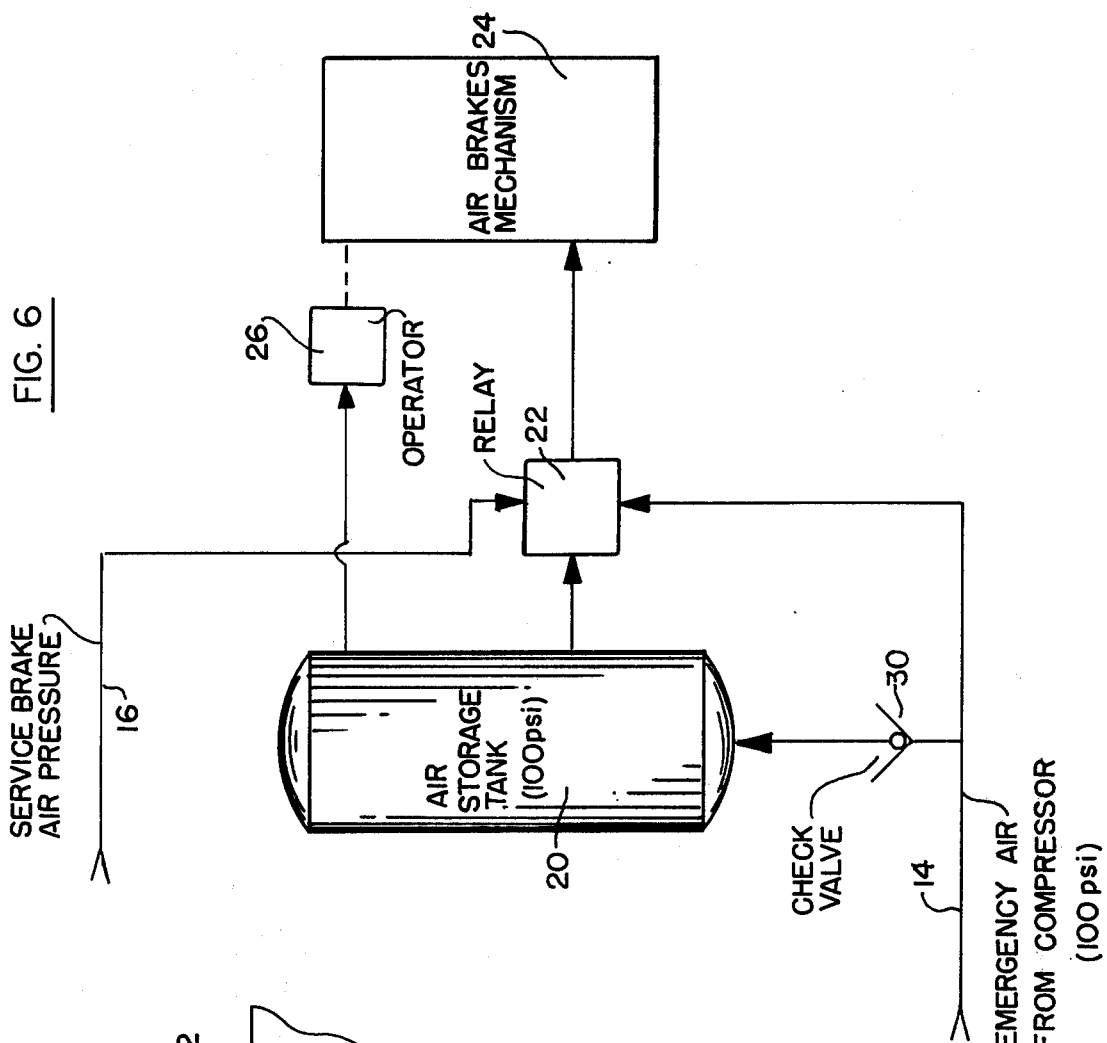
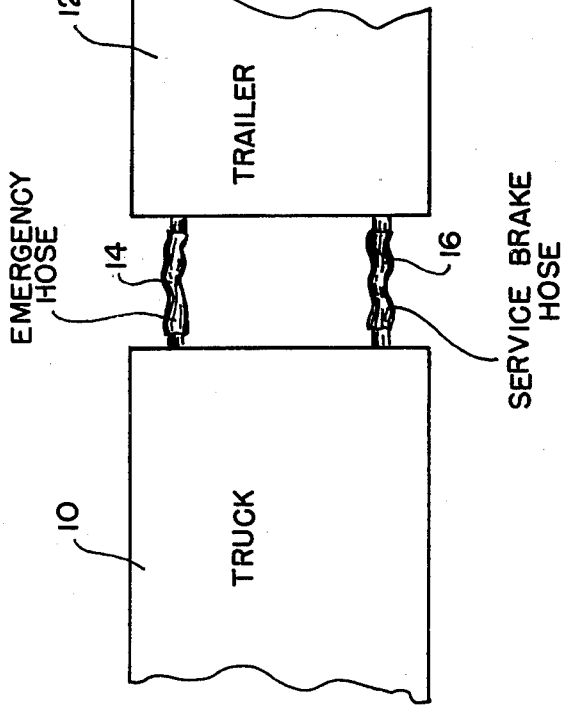

AIR BRAKE SAFETY MECHANISM

RELATED APPLICATION

Ser. No. 57,274 filed July 13, 1979 in the name of the present invention.

BACKGROUND

Attempts have been made in the prior art to provide an emergency braking system for automotive vehicles equipped with air brakes, which will serve to prevent the runaway of such vehicles should the vehicle service braking system fail due to faulty brake mechanisms, breakage in the fluid power lines, or for some other reason. Most prior art air brake emergency braking systems, however, are subject to certain disadvantages in that, for instance, they are too bulky, or in some cases consist of too many parts. In other instances, considerable and expensive changes on the truck or trailer chassis are necessary to install the prior art emergency braking systems. Moreover, some of the prior art emergency braking mechanisms are too expensive to justify their installation.

Many of the prior art emergency braking mechanisms are merely auxiliary brakes which can be applied in case the service brakes malfunction. In other words, such prior art mechanisms do not operate automatically should the service brakes become ineffective, and there is no means to inform the operator of a vehicle in advance that the service brakes are not working. Still other prior art mechanisms act on the cam shaft lever of the service brakes and cannot be applied in emergencies when the brakes are out of adjustment.

Some of the prior art emergency braking systems can also be used for parking purposes. However, for the most part, such prior art brakes can only be released by compressed air from the truck. Therefore, if such a prior art brake was installed in a trailer, there would be no way of moving the trailer unless a source of compressed air was available. The braking mechanism of the present invention has the feature in that it can be released and re-set mechanically and without the need for compressed air.

The present invention provides a relatively simple and inexpensive brake system which can be incorporated into trailers, tractors, trucks or buses, and which can be easily installed in existing vehicles equipped with air brakes. The invention also provides a brake which is economical and efficient, and which rapidly and automatically latches the air brakes of the vehicle whenever a failure in the service brake power system occurs, for any reason. Moreover, the invention provides a brake system which can be used for parking purposes, and which can be easily set and released mechanically.

Most heavy trucks and trailers are equipped with air brakes in which necessary pressure is built up and maintained in a storage tank by a compressor. Actuation of the brakes releases air under pressure against a diaphragm in a brake chamber, which is operatively connected to the brake rods of the vehicle, to set the brakes. The braking mechanism of the present invention operates in conjunction with such a service braking system, and, as mentioned above, serves to set and latch the brakes of the vehicle whenever the air pressure in the service braking system falls below a predetermined threshold.

Accordingly, a primary objective of the present invention is to provide an emergency and parking braking mechanism which is particularly adapted for use in conjunction with motor vehicles of the type using air brakes which necessitates a source of air under pressure for their operation, the braking mechanism of the invention being adapted to set and latch the brakes of the vehicle at any time that there is insufficient pressure from the source.

Another objective of the present invention is to provide an improved braking mechanism which is adapted to set and latch the brakes of the vehicle whenever the service braking system is in an abnormal condition, the mechanism of the invention incorporating a minimum number of parts so that it is not only subject to simple and trouble-free operation, but it also lends itself to economical mass production.

Another object of the present invention is to provide such a braking system which serves to operate air-operated brakes under emergency conditions, as when the air line is broken, or is leaking; and which when desired, may also serve as a parking brake.

Another objective of the invention is to provide such an emergency and parking brake mechanism which applies a mechanical lock to the brakes when set, which is not dependent on a compressed air source, which could be subject to leakage, and which has no tendency to fail when it has been set.

Yet another objective of the invention is to provide such an improved emergency and parking brake mechanism which may be mechanically released (for example, by a special tool to prevent vandalism), should it become necessary to move a parked trailer, or the like, when no source of compressed air is available.

BRIEF DESCRIPTION OF THE DRAWINGS

FIG. 5 is a schematic representation of a truck and trailer vehicle, and showing the air hose connections between the truck and the trailer; and FIG. 6 is a schematic diagram of the service air braking system of the vehicle, and also illustrating certain components of the present invention which are incorporated into the system.

DETAILED DESCRIPTION OF THE ILLUSTRATED EMBODIMENT

Figure 3:
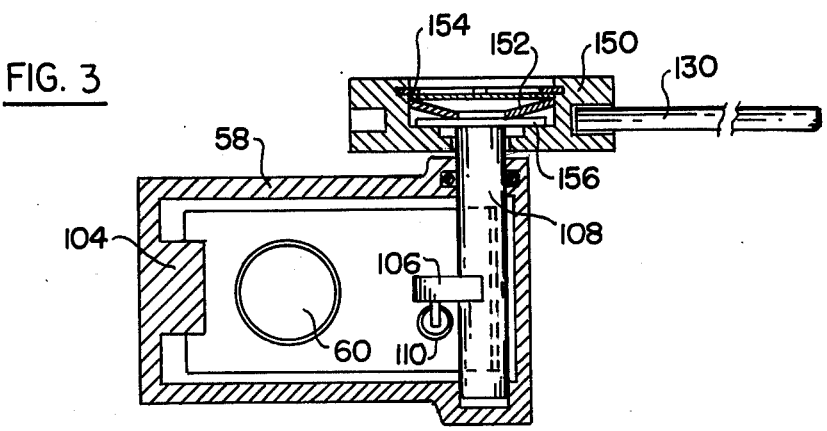
FIG. 3 is a cross-sectional view taken substantially along the line 3—3 of FIG. 1B.

As shown in FIG. 5, the air braking system of a truck 10 is coupled to the braking mechanism of a trailer 12 through a service brake hose 16, and also through an emergency hose 14. As shown in FIG. 6, the service braking mechanism of the trailer includes an air storage tank 20 which, for example, is coupled to an appropriate compressor in the truck, so that the air pressure within the tank may be maintained at a particular pressure, of, for example, 100 psi. The air tank 20 is coupled to a relay 22. Relay 22 is operated by the application of the service brake air pressure from the braking control mechanism of the truck 10 to introduce service air pressure from the air storage tank to the air brake mechanism 24 of the trailer 12, the service air having a value, for example, of from 0-100 psi, as the service brakes are operated in the truck, by way of the service brake hose 16. The air storage tank 20 is coupled to an operator 26 which, in accordance with the concepts of the present invention, applies a latching effect to the air brakes of the vehicle, whenever the air pressure in storage tank 20 falls below a predetermined level.

The air from the compressor in the truck is applied to the storage tank 20 through emergency hose 14 which is coupled to a check valve 30, and this air is also applied to the relay 22. During normal operation, the air compressor in the truck supplies air, for example, at 100 psi pressure through the emergency hose 14 and through check valve 30 to storage tank 20, to maintain that pressure in the storage tank; and this pressure is also supplied to relay 22.

Should the air pressure applied to relay 22 through emergency hose 14 ever fall below, for example, 65 psi, the relay then opens, and releases the high pressure air (100 psi) in the storage tank 20 to the brake mechanism 24 causing the vehicle brakes to set. Now, should the air pressure in tank 20 fall below a second threshold of, for example, 45 psi, the operator 26 then responds to lock the air brakes in their set position, effectively braking the vehicle.

Figure 1A:
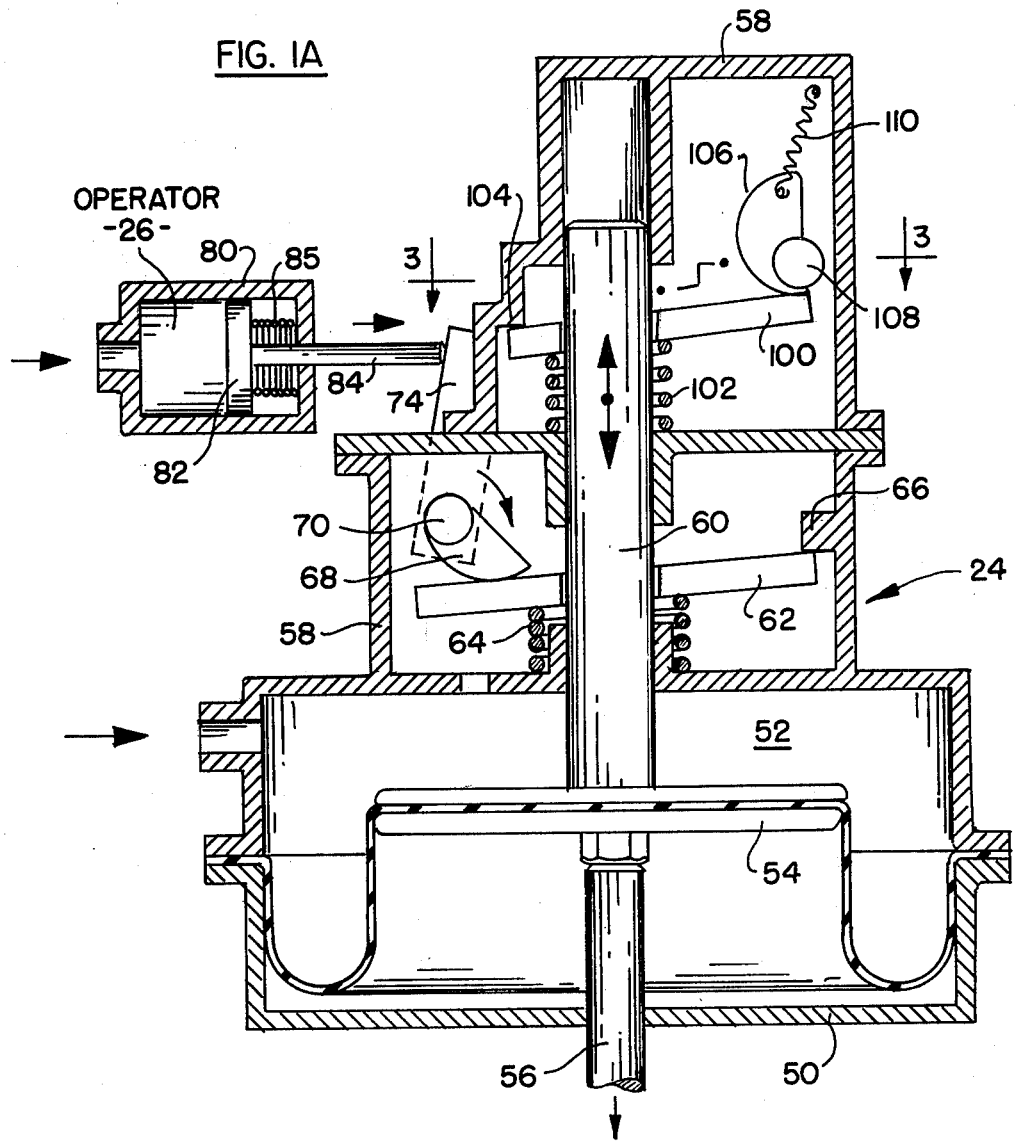
FIG. 1A is a sectional representation of a portion of an air braking mechanism for a vehicle, and illustrates modifications to the braking mechanism to incorporate the safety mechanism of the present invention, the representation showing the braking mechanism in its normal operational condition.

Reference is now made to FIG. 1A, which shows the braking mechanism of the invention, in one of its embodiments, and in a position for normal operation of the air brakes of the vehicle in which the mechanism is operated.

The mechanism includes a housing 50 which forms a brake chamber 52. A diaphragm or piston 54 is movably mounted within the brake chamber 52, and engages the end of a rod 56. Whenever fluid pressure is introduced into the brake chamber 52 from the service braking system of the vehicle, the piston 54 moves downwardly to cause rod 56 to apply the brakes of the vehicle. It will be understood that the brakes of the vehicle are set whenever there is sufficient fluid pressure in the brake chamber 52.

Thus, as shown in FIG. 6, as the service brakes of the vehicle are operated, during normal operation of the braking mechanism, air pressure is introduced through the hose 16 to the air brakes so that the rod 56 may apply braking pressure to the brakes of the vehicle. Also, when an emergency arises, so that there is a loss of pressure in the emergency hose 14, relay 22 introduces fluid pressure into the brake chamber 52 in order to set the brakes of the vehicle.

Figure 2:
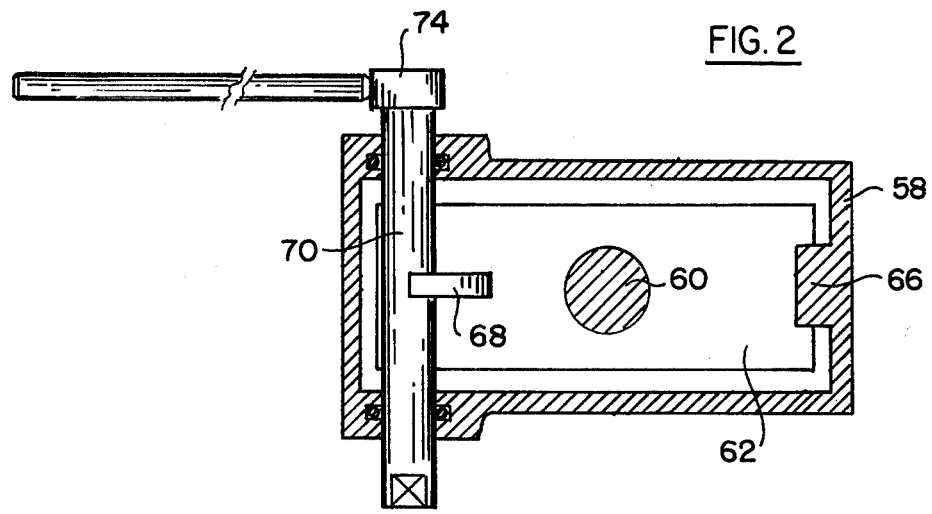
FIG. 2 is a cross-sectional view taken substantially along the line 2—2 of FIG. 1A.

The brake mechanism 24 of FIG. 1A also includes an airtight housing 58. A rod 60 is attached to the piston 54, and moves with the piston along a particular axis shown by the arrows in FIG. 1A, in both directions within housing 58. A first latching member 62 is positioned within the housing 58, and it has an aperture through which the rod 60 extends. The latching member 62 is supported in its illustrated position of FIG. 1A by means of a spring 64 which biases the latching member against a stop 66 on housing 58, and against a cam 68. Cam 68 is mounted on a shaft 70 (see also FIG. 2). Shaft 70 is rotatably mounted in the housing 58, and it includes a radial lever 74 at one end.

Operator 26 of FIG. 1A comprises a cylinder 80 and a spring-loaded piston 82 which is coupled to the lever 74 by way as shown in a piston rod 84.

So long as the air pressure from the storage tank 20 of FIG. 6 is above a particular threshold, piston 82 is displaced to the position shown in FIG. 1A, so that the latching member 62 is held in the illustrated position for free movement of the rod 60 in both directions through latching member 62, so that the braking mechanism operates normally in response to service braking pressure to control the brakes of the vehicle.

However, should the air pressure in storage tank 20 of FIG. 6 fall below a particular threshold, spring 85 of operator 26 forces piston 82 to the left in FIG. 1A, causing cam 68 to release the latching member 62. When that occurs, spring 64 biases the latching member to the position shown in FIG. 1B so that the latching member engages rod 60 as shown in FIG. 4.

During that condition, although the rod 60 is free to move in the downward position through latching member 62, as air pressure in the brake chamber 52 forces piston 54 in a direction to set the brake of the vehicle, the return motion of the rod along the axis is prevented by the locking engagement of the latching member 62 with rod 60.

Figure 4:
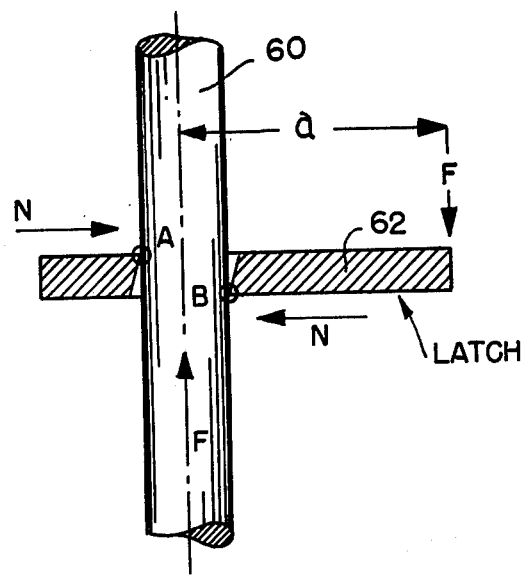
FIG. 4 is a schematic representation showing the manner in which a latch in the latching mechanism of the invention operates.

With reference to FIG. 4, the condition for the locking engagement of latching member 62 with rod 60 is that the moment $F \, x\alpha$ develops normal forces "N" at point "A" and "B", which must be greater than the forces $F \times f \times$ (where f is the coefficient of friction between the rod and the latch).

After the braking mechanism has been set, it can be released by the introduction of compressed air to the operator 26. Also, it can be released manually, if no compressed air is available, by turning the shaft 70 by appropriate manual means. It is preferred that a special key be provided to engage the shaft 70, to prevent unauthorizied persons from releasing the brake.

A second latching member 100 is also provided, which is spaced along the rod 60 from the latching member 62. A return spring 102 biases latching member 100 against a stop 104 in the housing 58 and against a cam 106 which is mounted on a shaft 108. Shaft 108 is rotatably mounted in the housing 58, as also shown in FIG. 3. Cam 106 is connected to a return spring 110 which normally holds the cam in the position shown in FIGS. 1A and 1B. As shown in FIGS. 1A, 1B, 1C and FIG. 3, rod 60 extends through an aperture in latching member 100 which is coaxial with the aperture in latching member 62.

Figure 1B:
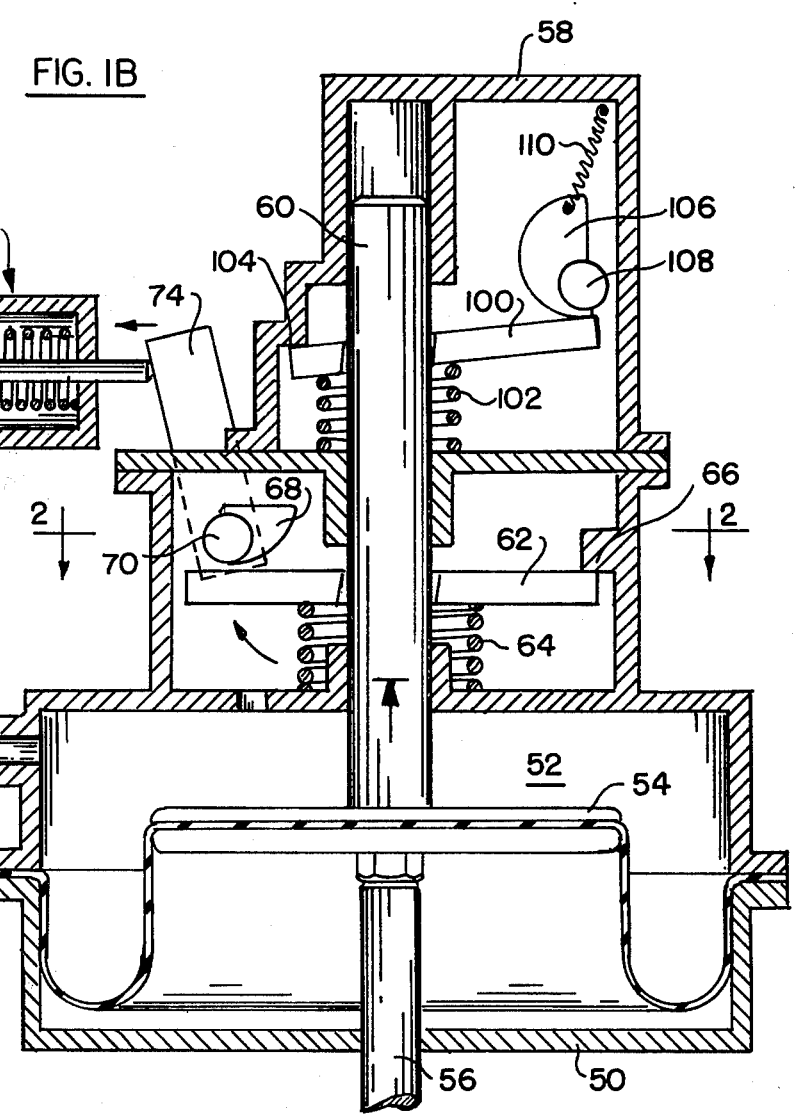
FIG. 1B is a sectional representation of the braking mechanism of FIG. 1A, but in a condition in which the brakes of the vehicle are locked by actuation of the safety mechanism of the present invention.
Figure 1C:
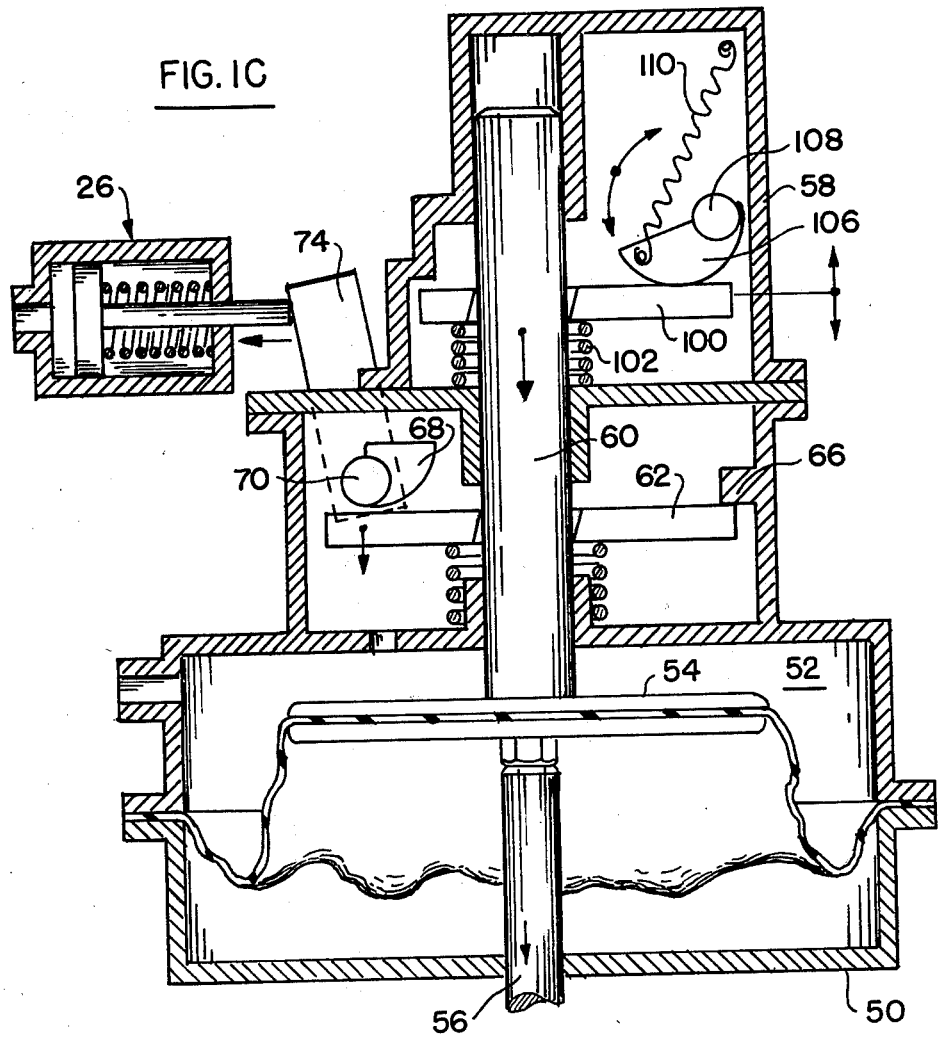
FIG. 1C is a sectional representation similar to the representations of FIGS. 1A and 1B, and showing the braking mechanism in a condition in which the brakes may be applied manually, for example, for parking purposes.

The shaft 108 may be turned by a handle 130 (FIG. 3) from the angular position shown in FIGS. 1A and 1B to the angular position shown in FIG. 1C. Then, when the handle is released, the return spring 110 returns the shaft 108 to the angular position of FIGS. 1A and 1B.

The handle 130 is coupled to the shaft 108 through a slip clutch assembly 150 which limits the torque exerted by the handle on the shaft 108 (FIG. 3). The slip clutch includes a usual diaphragm spring 152 which is held in place by means of a retaining ring 154, and which bears against a clutch plate 156 at the end of shaft 108.

When the shaft 108 is turned by the handle 130 to the position of FIG. 1C, it turns the latching member 100 to the position shown in FIG. 1C in which it locks with the rod 60, and continued turning of the shaft 108 causes the latch and the rod 60 to be displaced downwardly in FIG. 1C. When the manual force is removed from the handle 130 the latching member 100 is returned by the return spring 102 to its released angular position of FIGS. 1A and 1B, and to its original axial position of FIGS. 1A and 1B. However, the shaft 30 remains in its displaced position, since it is locked by the latching member 62, assuming that the handle 30 is operated when the latch 62 is in its locking position of FIGS. 1B and 1C. Therefore, by repeatedly turning the shaft 108 by the handle 130, the rod 60 can be displaced incrementally in a downward position to set the brakes of the vehicle, when the air pressure has been lost, or when it is not available, for example, for parking purposes.

The invention provides, therefore, an improved and simplified air brake safety mechanism which operates automatically to set and latch the air brakes of a vehicle for emergency and for parking purposes. It will be appreciated that although a particular embodiment of the invention has been shown and described, modifications may be made. It is intended in the claims to cover the modifications which come within the spirit and scope of the invention.

What is claimed is:

1. A fluid-operated braking mechanism for a vehicle comprising: a brake chamber; a movable member mounted in said brake chamber and responsive to a fluid pressure introduced into said brake chamber for setting the brakes of the vehicle; a rod coupled to said movable member and extending along a particular axis for movement in both directions along said axis; supporting means; a latching member mounted on said supporting means having an aperture therein through which said rod extends; operator means mounted on said supporting means and engaging said latching member to cause said latching member to assume a first angular position during normal operation of said braking mechanism in which said rod moves freely in both directions along said axis through said aperture, and for causing said latching member to assume a second angular position during abnormal operation of said braking mechanism to cause said latching member to assume a second angular position in which said rod is prevented thereby from moving along said axis in one direction; a second latching member mounted on said supporting means and spaced along said particular axis from said first-mentioned latching member and having an aperture therein through which said rod extends; spring means mounted on said supporting means for biasing said second latching member to a first angular position in which the rod moves freely in both directions along said axis through the aperture therein; and manually operated means for moving said second latching member to a second angular position in which said second latching member engages said rod and for moving said second latching member and said rod axially along said axis from a first axial position to a second axial position along said axis and in a particular direction.

2. The fluid-operated braking mechanism defined in claim 1, in which said operator means comprises a cylinder and piston combination which normally holds said latching member in its first angular position, and which responds to a drop in fluid pressure in said braking mechanism to cause said latching member to assume its second angular position.

3. The fluid-operated braking mechanism defined in claim 2, and which includes a rotatable shaft mounted on said supporting means, and cam means mounted on said shaft and interposed between the piston of the operator means and the latching member.

4. The fluid-operated braking mechanism defined in claim 2, and which includes spring means mounted on said frame for biasing said latching member to its first angular position.

5. The fluid-operated braking mechanism defined in claim 1, and which includes a return spring mounted on said supporting means and engaging said second latching member for returning said second latching member to its first angular position and to its first axial position with respect to said supporting means upon the release of manual pressure from said manually operated means.

6. The fluid-operated braking mechanism defined in claim 1, in which said manually operated means comprises a shaft rotatably mounted on said supporting means, and a cam mounted on said shaft in position to engage said second latching means when said shaft is turned from a first to a second angular position.

7. The fluid-operated braking mechanism defined in claim 6, and which includes a handle connected to said shaft and extending radially outwardly therefrom.

8. The fluid-operated braking mechanism defined in claim 7, and which includes a torque-limiting slip clutch coupling said handle to said shaft.

9. The fluid-operated braking mechanism defined in claim 1, and which includes an air-tight housing mounted adjacent to said brake chamber and enclosing said rod and said latching member.

10. The fluid-operated braking mechanism defined in claim 3, in which said shaft may be rotated manually to release the latching member.

* * * * *